US005719344A

United States Patent [19]

Pawate

[11] Patent Number: 5,719,344

[45] Date of Patent: Feb. 17, 1998

[54] METHOD AND SYSTEM FOR KARAOKE SCORING

[75] Inventor: Basavaraj Pawate, Ibaraki, Japan

[73] Assignee: Texas Instruments Incorporated, Dallas, Tex.

[21] Appl. No.: 424,752

[22] Filed: Apr. 18, 1995

[51] Int. Cl.[6] .............................. G09B 15/02; G10H 7/00

[52] U.S. Cl. ........................ 84/609; 84/477 R; 434/307 A

[58] Field of Search ..................... 84/601, 602, 609–615, 84/634–638, 453, 477 R, 478; 360/13, 14.1, 14.2, 14.3; 434/307 A

[56] References Cited

U.S. PATENT DOCUMENTS

| | | | |
|---|---|---|---|
| 5,287,789 | 2/1994 | Zimmerman | 84/477 R |
| 5,341,253 | 8/1994 | Liao et al. | 360/13 X |
| 5,395,123 | 3/1995 | Kondo | 84/615 X |
| 5,434,949 | 7/1995 | Jeong | 84/477 R X |
| 5,557,056 | 9/1996 | Hong et al. | 84/610 |
| 5,563,358 | 10/1996 | Zimmerman | 84/477 R |
| 5,567,162 | 10/1996 | Park | 434/307 A |

*Primary Examiner*—Stanley J. Witkowski
*Attorney, Agent, or Firm*—Robert L. Troike; David Denker; Richard L. Donaldson

[57] ABSTRACT

A Karaoke system scoring method and system (10) is provided based on detecting, for example, frame energy (19 or 19') of the Karaoke singer and the frame energy of the original artist (29 or 29'). The frame energy is quantized (41 and 43) and compared (45) and based on the comparison a score (37) is generated and displayed (15).

3 Claims, 1 Drawing Sheet

METHOD AND SYSTEM FOR KARAOKE SCORING

TECHNICAL FIELD OF THE INVENTION

This invention relates to Karaoke and more particularly to a method and system for scoring a Karaoke singer's performance.

BACKGROUND OF THE INVENTION

Karaoke systems are well known. One or more singers sing a song accompanied by prerecorded music from a source such as a compact disc (CD). The original artist/singer's voice is nullified and the singing user sings into a microphone and the singing user's voice picked up by the microphone is mixed with the original background music and applied to speakers.

The make up of a piece of music involves a whole variety of elements such as pitch, note length, tempo, etc. For recreation purposes, there has been some Karaoke systems that provide scores at the end of the performance. It has been found that prior art Karaoke machines scoring does not appear to actually be based on how well the Karaoke singer's voice matches the original artist.

SUMMARY OF THE INVENTION

In accordance with one embodiment of the present invention a scoring system and method is provided that at the end of a song a score would in some way reflect how dose the singer's voice was to the original artist's. The method includes detecting a voice characteristic of both the original artist and the Karaoke singer producing a score based on the comparison of the voice characteristic.

DETAILED DESCRIPTION OF THE INVENTION

Figure 1:
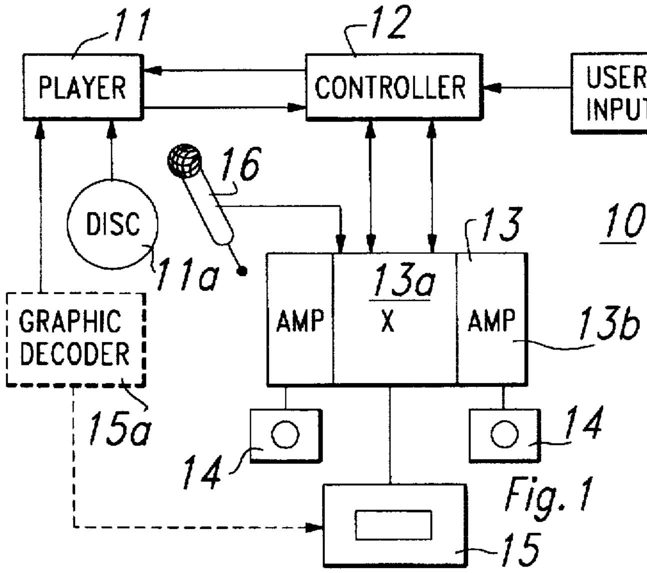
FIG. 1 is a block diagram of the a Karaoke system.

FIG. 1 is a block diagram according to the prior showing the configuration of a "Karaoke" machine 10 which includes a laser video disc musical accompaniment playing apparatus 11. This laser video disc musical accompaniment playing apparatus 11 comprises a laser video disc automatic changer for accompanying therein a plurality of laser video discs 11*a* serving as a musical accompaniment playing information memory medium. The machine 10 includes a controller 12 for controlling the laser video disc automatic changer 11 to allow it to select a desired laser video disc. A laser video disc automatic changer request is inputted from a user operation input terminal. The machine 10 further includes a signal processor 13 including a mixer 13*a* and amplifiers 13*b*, left and right speakers 14 for outputting as sound a reproduced audio signal, an image display unit 15 for displaying a reproduced image signal from the video disc 11*a* as an image, and a microphone 16 for coupling a user's voice sung in concert with the background music as input to amplifiers 13*b*. The mixer 13*a* mixes the background audio signal from the laser video disc automatic changer 11, which is a musical signal from the music accompaniment player, with audio signal of a voice sung from the microphone 16, and outputs to speakers 14.

In accordance with another Karaoke machine the player 11 is a CD automatic changer or audio cassette player for accommodating therein a plurality of compact discs or audio cassettes serving as a musical accompaniment playing information memory medium and reproducing them. The controller 12 controls the CD automatic changer or cassette player to allow it to select the desired compact disc or audio cassettes and the CD changer or cassette player by a request inputted from the user input. The signal processor 13 and speakers 14 output and reproduce audio signal as sound. In some embodiments a graphic decoder 15 (in dashed lines) converts graphic data reproduced from a subcode data in the compact disc to an image signal that is displayed on image display 15. The microphone 16 output is mixed in processor 13. A more detailed description of a Karaoke machine maybe found in various patents such as U.S. Pat. No. 5,194,682 of Oakamura et al. incorporated herein by reference.

Figure 2A:
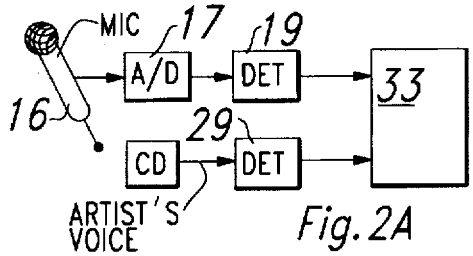
FIG. 2A is a block diagram of an alternate system where artist's vocal is available.
Figure 2:
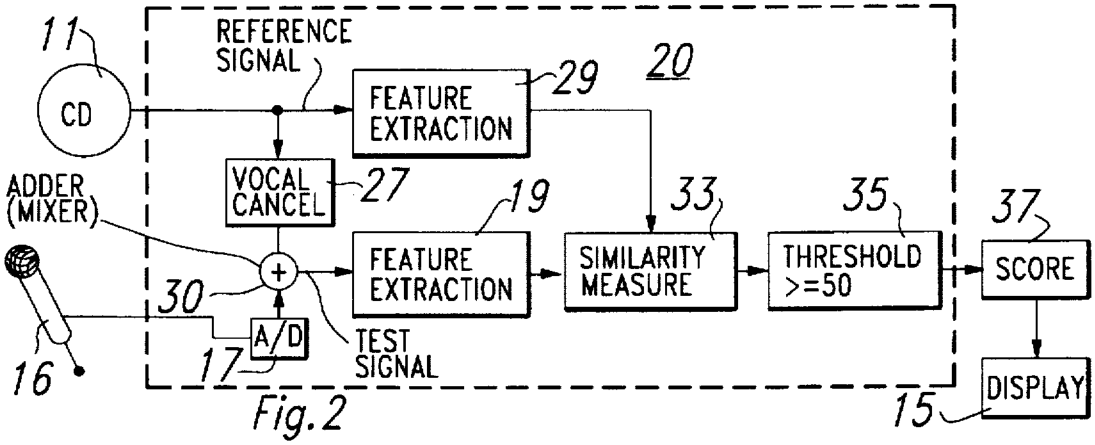
FIG. 2 is a block diagram of the system according to one embodiment of the present inventions.

Referring to FIG. 2, there is illustrated a scoring system 20 according to one embodiment of the present invention where the original artist's vocal and music are mixed on both channels. The scoring system 20 is part of the signal processor 13 of FIG. 1. The user sings into the microphone 16 and this is converted to data via analog to digital (A/D) converter 17. The output from the CD or video disc player 11 is applied to a vocal canceler 27 to provide the background music only at mixer (adder) 30. This vocal cancellation can be done by subtracting the right channel from the left channel, under the assumption that the voice signal is balanced on both channels. The background music from the vocal canceler 27 is mixed with the user's vocal at mixer 30 to form a test signal x equal to user's vocal plus background music. The direct mixed artist's vocal and background output from the player 11 is a reference signal r. A feature is then extracted from test signal x at detector 19 and reference signal r at detector 29. This feature may be frame energy, pitch, zero crossing rate or filter bank amplitude. These signal parameters are combined to form a feature vector. A similarity measure 33 is computed between the reference feature vector at detector 29 and the test feature vector at detector 19. The means could be (a) L1 norm, where similarity measure=sum (i–1 to i) {x(i)–r(i)} where the sum is computed over the dimension of the vector; (b) L2 norm, where similarity measure=Euclidean distance between x and r=sum (i=1 to i) {x(i)–r(i)}2 or (c) Hamming distance, where x and r are quantized to two levels, 0 and 1 and an exclusive OR is performed between the test and reference signals. According to the above definitions, a similarity measure close to 0 implies a good match and a large number implies big dissimilarity. Note that the above similarity measure is performed every frame (since we look upon the signal as a stream of successive frames of data). The score is then defined as the accumulation of these similarity measures across the entire song, which consists of several frames. After computing the similarity measure across the entire song, it is then thresholded at threshold 35** so we don't allow the score to go too bad. This is to prevent the user from getting upset.

In accordance with one preferred embodiment the feature is frame energy. This incoming data to the frame energy detectors 19 and 29 is a continuous stream of pulse code modulation (PCM) data which, for example, are analyzed in frames of 20 milliseconds duration. In the A/D converter 17 the samples taken over 20 milliseconds make up the frame. For each frame the frame energy is determined at frame energy detectors 19 and 29.

In accordance with another embodiment as shown in FIG. 2A the reference is the artist's vocal at the input to the feature extractor such as from energy detector 29' and the microphone output (user's singing voice alone) to frame energy detector 19'. In certain Karaoke machines such as DVS (Digital Video Systems) or the Laser Disc (LD) Karaoke system in Japan the artist's voice is separate.

Figure 3:
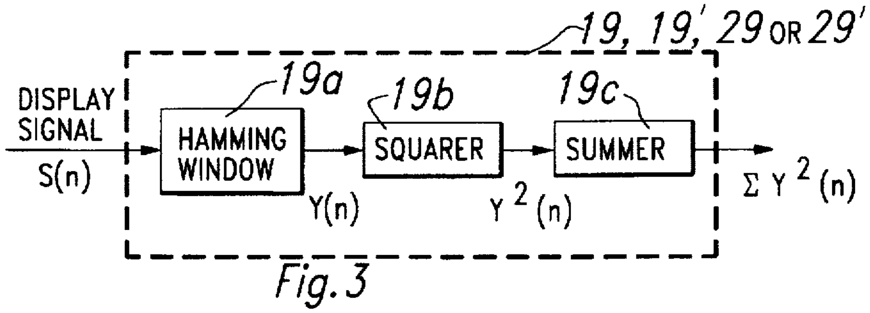
FIG. 3 is a block diagram of the Frame Energy Detector in FIG. 1.

Referring to FIG. 3, there is illustrated the frame energy detector 19, 19', 29 or 29' of FIG. 2 or 2A. The digital signal S(n) is applied to a Hamming window 19*a* to smooth the boundaries of the 20 millisecond frame window to obtain modified signal Y(n). In a Hamming window one multiplies the sample by a function to minimize the contribution of the edges. The output signal Y(n) from the Hamming window 19*a* is squared in squarer 19*b* to get $Y^2(n)$. The squared signal output from the squarer 19*b* is summed in Summer 19*c* for the entire frame to get frame energy $\Sigma Y^2(n)$.

The output from the frame energy detector 19 is applied to quantizer 43 that quantizes the energy of each frame into two levels using a threshold. See FIG. 4. If the energy level exceeds a threshold level it is given a logical value of "0". Therefore for a group of frames a series of 1s and 0s are provided out of the quantizer.

The PCM data (or reference signal r) from most compact disc (CD) systems, represents the original artist's voice and the background music. The PCM data of the original artist's voice and the background music undergoes frame energy detection in detector 29 and is quantized in quantizer 41 which uses the same threshold as quantizer 43 and provides a logical value of 1 or 0. The input frame energy at detector 19 in FIG. 2 is quantized to form logical values of the test signal x including the user's voice plus the background music. This is compared to the quantized reference frame energy (from detector 29) of the original artist and background music in reference signal r to compute a score. This may be done by an Exclusive OR 45 and summer 47. See FIG. 4. The summer 47 is for example a register that counts the number of matches or misses of the quantilized logic levels over a predetermined number of frames to arrive at a score. If, for example, the output level of both frame energy detectors 19 and 29 agree the score is increased higher. If there is not a match, the score is decreased. The score is placed in register 37 and may be displayed on a video display 15.

Figure 4:
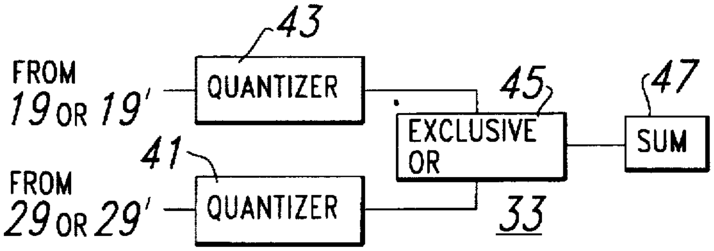
FIG. 4 is a block diagram of a similarity measure in FIGS. 2 and 2A.

In a similar manner as shown in FIG. 4, the quantized frame energy of the Karaoke singer's voice at quantizer 43 coupled to detector 19' is Exclusively ORed with the quantized original artist's voice at quantizer 41 coupled to detector 29' at Exclusive OR logic 45.

In a similar manner, the score can be based on pitch and in which in place of the frame energy detectors 19 and 29 (or 19' and 29') pitch detector circuits are used and if the pitch of a frame is above a certain threshold level the quantizers 41 and 43 provide a logical value 1 and if below a logical value of zero and the quantized pitch levels are compared for the scoring.

OTHER EMBODIMENTS

Although the present invention and its advantages have been described in detail, it should be understood that various changes, subtractions and alterations can be made herein without departing from the spirit and scope is the invention as defined by the claims.

What is claimed is:

1. A method for Karaoke scoring, the method comprising the steps of:

detecting frame energy of a Karaoke singer's singing voice singing to pre-recorded music in a Karaoke machine;

detecting frame energy of an original artist's singing voice on the prerecorded music;

wherein each said detecting frame energy step includes sampling a received signal to provide digital signal S(n), processing said digital signal S(n) by a Hamming window to obtain a modified signal Y(n), squaring the signal Y(n) to get signal $Y^2(n)$ and summing signals $Y^2(n)$ for a frame;

quantizing said detected frame energy of said Karaoke singer's voice and quantizing said detected frame energy of said original artist's voice;

comparing, said quantized frame energy of said Karaoke singer's voice to said quantized frame energy of said original artist's voice; and providing a score based on an accumulated comparison of the frame energy.

2. The method of claim 1 wherein said frame is 20 milliseconds.

3. A Karaoke scoring apparatus comprising in combination:

a first detector for detecting frame energy of a Karaoke singer's voice;

a second detector for detecting frame energy of said original artist's voice;

wherein each of said first and second frame energy detectors include means for sampling received signals to provide digital signal S(n), means for processing said signal by a Hamming window to provide signal Y(n), means for squaring said signal Y(n) to provide signal $Y^2(n)$ and means for summing signals $Y^2(n)$ over a frame period; and a scoring device coupled to said first and second detectors for comparing said frame energy of Karaoke singer's voice to frame energy of said original artist's voice and providing a score based on an accumulated comparison of the frame energy.

* * * * *